March 30, 1965 C. G. ALEXIOU 3,176,220
FLASHLIGHT FOR CONTINUITY CHECK WITH SELF
CONTAINED BATTERY CHARGER ACCESSORY
Filed Oct. 8, 1962
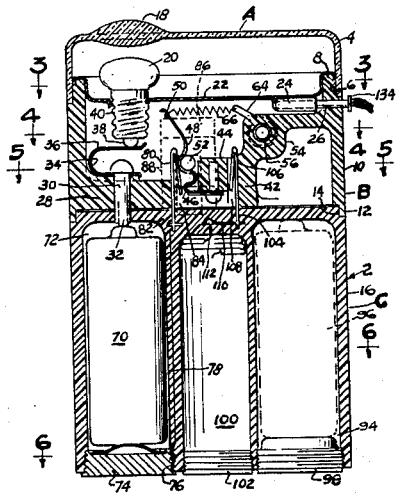
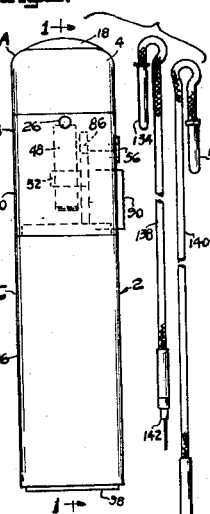
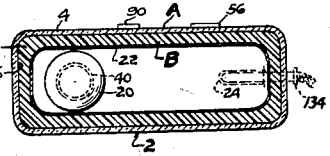
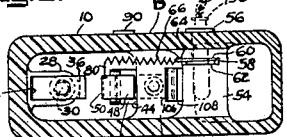
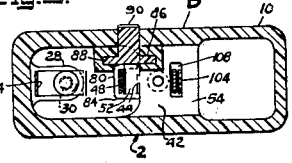
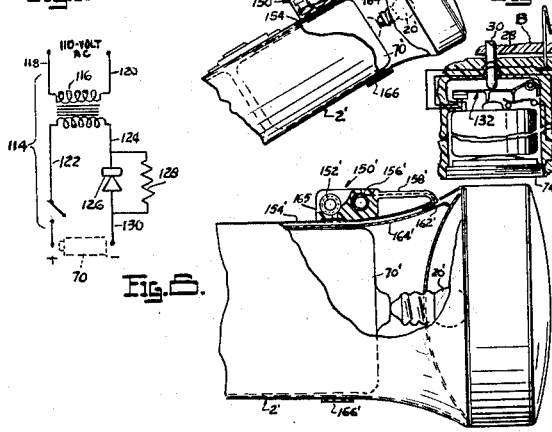
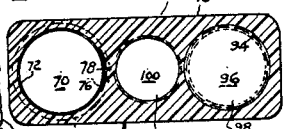
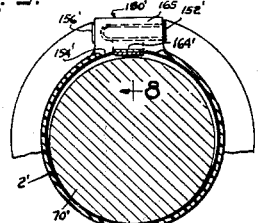
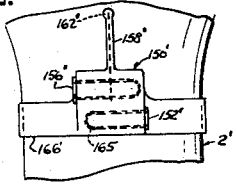
INVENTOR.
Christos G. Alexiou
BY

3,176,220
FLASHLIGHT FOR CONTINUITY CHECK WITH SELF CONTAINED BATTERY CHARGER ACCESSORY
Christos G. Alexiou, 6758 Yolanda Ave., Reseda, Calif.
Filed Oct. 8, 1962, Ser. No. 228,857
2 Claims. (Cl. 324—53)

This invention relates to a combination of a flashlight apparatus and a continuity tester device and more particularly to an improvement in apparatus adapted for uses in connection with household appliances that may be employed in case of emergency or in trade.

Accordingly an object of the invention is to provide a compact flashlight apparatus having means for storing dry-cells therein, also, said apparatus having means for attaching a pair of suitable test leads thereto that may be used for a continuity check of the electric current, broken wires, disconnected connections, and the like.

A further object of the invention is to provide said flashlight apparatus with a set of suitable longitudinal compartments that may be used for depositing holding and enclosing therein suitable dry-cell batteries and a wiring system for a battery recharge unit and thereby securing a dry-cell battery re-charge from the conventional 115-117 volt A.C. current.

Another object of the invention is to provide said flashlight unit or apparatus with a set of detachable test leads whereby the continuity check in the electrical system may be had without disturbing or dismantling said flashlight apparatus.

A further object of the invention is to provide a conventional flashlight apparatus with a suitable switch means so that same may be used for controlling the "On" and "Off" current discharge therein and thereby controlling the light bulb illumination, and in addition, said switch having suitable tubular sockets associated therewith adapted for attaching and connecting said test leads thereto that may be used for the continuity and other test of the electric current.

The invention also has for its objects to provide such means that are positive in operation, convenient in use, easily installed in a working position and easily disconnected therefrom, economical in manufacture, relatively simple, and of general superiority and serviceability.

Other and further objects and advantages of the invention as will hereinafter more fully appear, it is attained by the construction herein shown on the drawings and described in the specification forming a part of the application.

Reference is had to the accompanying drawings, in which the similar reference characters denote the same parts.

In the drawing:

FIG. 1 shows a vertically sectional view of the flashlight apparatus, disclosing the compartments and component parts therein, taken on line 1—1 of the FIG. 2.

FIG. 2 shows a vertical side elevational view thereof, taken from the right of the FIG. 1.

FIGS. 3, 4, 5 and 6 show the transverse horizontally sectional views of the flashlight apparatus, taken on lines 3—3, 4—4, 5—5 and 6—6 respectively, of the FIG. 1.

FIG. 7 shows a fragmentary and partly sectional view of the adapter, when connected to and used with a conventional flashlight apparatus.

FIG. 8 shows an enlarged fragmentary and sectional view of the flashlight head section, showing the lead line connections in modified form, taken on line 8—8 of the FIG. 9.

FIG. 9 shows a vertically sectional and fragmentary view of the flashlight apparatus, taken in the direction of lines 9—9 of the FIG. 8.

FIG. 10 shows a fragmentary top view of the adapter, taken from the top of the FIG. 8.

FIG. 11 shows a wiring diagram of the electrical system adapted for re-charging a dry cell battery that may be mounted in the end compartment of the apparatus shown in FIG. 1.

FIG. 12 shows a vertically sectional and fragmentary view of the auxiliary switch used in recharging dry cell battery.

Describing the invention more in detail, in its broader aspects, said invention comprises a flashlight apparatus or unit, and is generally designated by numeral 2, which consists of a top enclosure A, and an upper housing B including a bottom housing C.

Said top enclosure A is made out of suitable translucent and transparent material forming a cover plate 4, the lower supporting section of which being removably secured upon and over an upwardly extending ledge 6 which is disposed in and extends from the top ridge section 8 of said upper housing B.

The outer section of said housing B comprises a wall 10 wherein the lower edge is provided with a recessed extension 12 adapted for engaging a recessed wall 14 disposed at the upwardly extending rim which is formed out of the outer wall 16 provided in said bottom housing C of the apparatus.

Said enclosure A is removable, having a wall extending upwardly and terminating with said cover plate 4 which is provided with a transparent and light condensing lens 18 adapted for allowing the light rays emitting from a light bulb 20 to pass therethrough.

Said light bulb 20, when in position, is disposed interiorly of said enclosure A and is mounted in a socket provided in and formed out of a suitable reflecting plate 22, thus allowing the light rays emitting from said light bulb 20 to become reflected against said cover plate 4 and also allowing said light rays to pass through said lens 18 and become intensified and concentrated to a degree that may be most desirable in practice.

The outer edges of said reflecting plate 22 are suitably turned and flared for forming a closure strip adapted for enclosing and foresealing said ledge 6 when mounted thereover, while the mid-section of said reflecting plate is provided with a dwell which extends longitudinally and slightly below the extending edge of said ledge 6, having the underside surface section of said reflecting plate dwell, and at one end thereof, provided with a first tubular contact socket 24, as shown.

Said tubular contact socket 24 may, if so desired, be an integral part of said reflecting plate 22, or, be made in form of a tubular sheath and then soldered in position as shown, having the open end thereof directed toward a companion opening or aperture 26 disposed in and passing through said top ridge section 8 of said upper housing B.

At the lower end section of said upper housing B and beneath said mounted light bulb 20, a suitable extending boss 28 is provided which is adapted for securing thereto a contact pin 30 having the lower end 32 protruding downwardly into and terminating within said bottom housing C.

Said contact pin 30 is made in form of a suitable cylindrical plug and is used as a rivet of which the upper end portion thereof is arranged for mounting and for holding in position the bottom end of a flexible U-shaped contact plate 34.

The upper end 36 of said contact plate 34, when in secured position, provides a contact for the downwardly extending contact lobe 38 which is provided in the lamp base 40 of said light bulb 20.

The mid-section 42 of said upper housing B is provided with a suitable central bracket 44, having the lower end section arranged for mounting thereon a contacting plate 46, of which the lower end thereof is held in place by means of a suitable pin or a rivet, as shown.

Between said central bracket 44 and said extending boss 28 a suitable passage is provided therein, which is adapted for allowing the upwardly extending end section of said contacting plate 46 to pass freely therethrough, said upwardly extending section being provided with a pair of yielding corrugations or loops of which the upper loop extension 48 is disposed over the upper edge of said central bracket 44.

Said loop extension 48 of said contacting plate 46 is also provided with an angularly and upwardly directed extension of which the extending end thereof terminates with a contact tip 50, as shown.

Said contact tip 50 suitably formed, the end of which extends toward the lamp base 40 and is adapted for making a contact therewith when said upwardly directed extension of said contacting plate 46 is sidewardly pressed and slanted, as shown in dotted lines, said sideward pressure and the slanting thereof is accomplished by means of a switch pin 52 which is normally mounted in the upper corrugation of said upper loop 48 and when moved upwardly, thereby actuating the loop folds of said plate 46, the manner of operation of which will be presently described.

At the upper portion of said mid-section 42 a suitable supporting boss 54 is provided having an aperture or hole adapted for supporting a tubular contact 56 therein and which is made in form of a socket, said boss 54 is also provided with a transversely positioned slot 58 (see FIG. 4) which extends to a sufficient depth in said boss 54, so that a circular plate 60 may be mounted therein and held in its central position by means of said contact socket 56 and wherein it is secured by means of a spring washer 62.

Said circular plate 60 is provided with an outwardly extending lug 64 the extended end thereof having a hole provided therein to which one end of a conducting coil or spring 66 is connected, while the other end of said spring is attached to said upwardly disposed loop extension 48 and slightly below said contact tip 50 of said contacting plate 46.

In this manner the electrical contact between said tubular contact 56 including said contacting plate 46 is established, and also, the electrical contact between said contact pin 30 through the lamp base 40 and the reflecting plate 22 including said tubular contact socket 24 is made complete.

Said lower end 32 of said contact pin 30 extends into an upper section of said bottom housing C passing through an aperture provided in said extending boss 28 and is adapted for making a contact with the electrode of a dry cell battery 70 which is mounted within a suitable longitudinal compartment 72, said battery 70 being supported in position by means of a closing plug 74, said plug in a preferred form is made out of suitable conductive material and adapted for making a contact with a plate 76 which is embedded within the wall of said housing C and to which a contact wire 78 is connected, said wire 78 leading upwardly and connecting a base of a contact prong 80 which is secured firmly in the upper cross wall 82 of said bottom housing C.

Said contact prong 80 extends upwardly through a passage 84 and is guided into position for making a contact with the side section of said upper loop extension 48 of said contacting plate 46, so that when said switch pin 52 is moved upwardly for causing said contact tip 50 to bear against the lamp base 40 then the electrical current in said dry cell battery 70 will flow into and through said U-shaped contact plate 34 and will cause said light bulb 20 to become energized.

Said switch pin 52, in construction, is an extension of a switch plate 86, see FIG. 5, which is slidably mounted in a T-shaped slot 88 disposed in a suitable internal boss in said housing B and in close proximity to said mid-section 42, said switch plate 86 having a switch boss 90 extending outwardly and protruding through a verticularly longitudinal opening disposed in close proximity to said slot 88 provided at the side wall 10 of said upper housing B, so that when moving or sliding said switch boss 90 together with said switch pin 52 into an upward direction, then the electrical contact between the respective component parts will be established and thereby closing the electrical circuit, and when said switch boss 90 is moved into a downward position then said contact tip 50 is moved away from said lamp base 40 and thus causing said electrical circuit to become broken and which also causes the light bulb 20 to become de-energized.

Said housing C is provided with an auxiliary longitudinal compartment 94 wherein a spare dry cell battery 96, shown in dotted lines, may be housed, the opening of said compartment 94 is enclosed by means of a removable closing plug 98.

The center section of said housing C is provided with a center compartment 100 which is enclosed by a detachable closing plug 102, said compartment 100 at its upper end is enclosed by said upper cross wall 82 and adapted for securing therein a suitable companion contact prong 104, the lower end thereof being embedded and firmly anchored in place while the upwardly extending end 106 is fitted within an aperture 108 provided in said mid-section 42 of said upper housing B, as shown.

Said companion prong 104 is provided with a base plate 110 to which a suitable wire 112 is connected, the extended end thereof is deposited in said center compartment 100, and which may, if so desired, be connected to the battery recharging unit 114, shown in FIG. 15.

It may be noted, that said center compartment 100 may remain empty if so desired, or, it may be used for storage of the light bulbs or the like, or, that the space so provided may be used for mounting therein said battery re-charging unit 114, which consists of a transformer 116 of which the lead line 118 connects with the contact prong 80 and the lead line 120 is connected to said wire 112.

The opposite side of said transformer 116 is provided with a lead wire 122 adapted for connecting the cathode electrode of said battery 70, while the lead wire 124 is connected to a selenium rectifier 126 having a shunted resistor 128 provided therein and from which a common lead line 130 connects a contacting switch 132 that is disposed at the anode electrode of said dry cell battery 70 (shown in FIG. 16.)

The wiring connections of the recharging unit 114, as shown in FIG. 16, are arranged and assembled within said compartment 100, so that when it is desired to recharge said battery 70 disposed in said longitudinal compartment 72 then said upper housing B is removed from its mounted position and the contact and companion prongs 80 and 104 respectively, are inserted in a conventional electric current carrying socket delivering electrical current of 110–117 A.C. volts.

Said contacting switch 132 is arranged for connecting lead wires to the battery 70 when said contact pin 30 is placed in its receiving aperture in the manner shown in FIG. 1, and at the same time opening a contact with a plate below said switch plate which makes a contact with the anode electrode of said battery 70 only when said contact pin 30 is removed from its mounted position. Therefore, when said flash light is desired to be used, said upper housing B is replaced in its mounted position and then said switch plate 86 is employed for making a contact for energizing said light bulb 20.

When a continuity check is desired using said flash light 2 as an indicator, then a contact plug 134 is inserted in said first tubular contact socket 24 and another contact plug 136 is positioned in said tubular contact 56, each plug 134 and 136 having a pair of separate lead wires 138 and 140, each terminating with a suitable prodding rods 142 and 144 respectively, so that the electrical current may be received from said dry cell battery 70 when said switch plate 86 is retained in an inactive position, as shown in FIG. 1.

As shown in FIG. 7, a conventional flash light unit 2' may be used by employing continuity check attachment 150 which comprises a suitable retainer 151 wherein one tubular socket 152 is grounded to the outer housing or case 154 of said flash light unit 2', and the second tubular socket 156 mounted therein is provided with a connecting lead wire 158 the extended end of which being provided with suitable insulation and allowed to pass through an aperture or hole 160 for connecting the wire end 162 to a contact plate 164.

The contact plugs 134' and 136' of the prodding lead wires may then be attached in the respective sockets 152 and 156, so that said light bulb 20' may be energized by the electrical current passing from said battery 70' when said prodding rods 142 and 144 are in use.

In order to hold said continuity check attachment 150 in place, a suitable band 166 is provided and made an integral part of said retainer 151, said band being flexible and resilient in texture and adapted for fastening and holding said attachment around said housing of said flash light unit 2' when same is in its mounted position.

In FIGS. 8, 9 and 10, the continuity check attachment 150' is provided with a pair of tubular sockets 152' and 156' which are mounted in a suitable base or retainer 165 having a resilient band 166' adapted for holding said retainer firmly in place upon said outer case 154' of the flashlight unit.

Said tubular socket 152' is grounded to said outer case 154', as shown in FIG. 8, and the tubular socket 156' is provided with a connecting lead wire 158' having the extended wire ends 162' connected to said contact plate 164', so that when said respective contact plugs 134 and 136 of said prodding lead wire lines 138 and 140 are positioned in place and interconnecting the respective sockets 152' and 156' then the electric current flowing from said dry cell battery 70' may be used for the continuity check and other purposes desired and thus energizing said light bulb 20' of said flashlight unit 21.

While I have thus described the invention with great particularity, it will be clear that the same may be modified throughout a wide range.

I accordingly do not propose to be limited to the exact details of construction herein shown on the drawings and described in the specification, but reserve the rights in practice to make any necessary changes and modifications therein, which may come within the scope of the appended claims.

I claim as my invention:

1. In the apparatus of the class described adapted for use in a continuity check, comprising, a flashlight unit having an upper and a bottom housing detachably mounted and super-imposed one over the other, said upper housing having a top ridge section extending upwardly, a reflecting plate having a dwell and mounted within said top ridge section, a wall in said upper housing having an aperture passing therethrough, a light bulb secured in said reflecting plate, a set of longitudinal compartments in said bottom housing positioned adjacently to each other and each having an open and threaded end terminating at the bottom of said housing, an outer wall surrounding said compartments in said bottom housing, a closing plug secured in each of said open and threaded ends of said longitudinal compartments in said bottom housing, a dry cell battery disposed in one of said longitudinal compartments having the anode electrode thereof disposed in close proximity to and connecting said light bulb secured in said reflecting plate of said upper housing, a slidably movable switch in said upper housing, a contacting plate in said upper housing and actuated by said movable switch for making a contact with the cathode electrode of said dry cell battery and said light bulb and thereby energizing same, a top enclosure made of translucent material for enclosing said upper housing, a transparent lens in said top enclosure made an integral part of said translucent material and also super-imposing said light bulb for concentrating and intensifying the light rays passing from said light bulb and when said light rays are reflected from the surface of said reflecting plate; a first tubular contact socket secured at the bottom surface of said reflecting plate and having the opening thereof directed outwardly toward said aperture disposed in said wall of said upper housing, a second tubular contact socket in said upper housing passing through the wall thereof and also having the opening thereof directed outwardly therefrom, means in said second tubular contact socket for connecting said contacting plate and thereby securing a closed electrical circuit between said dry cell battery including said first tubular contact socket, a pair of lead wires each having a contact plug at the respective ends thereof and being adapted for connecting the respective first tubular contact socket and said second tubular contact socket, each of said lead wires having a prodding rod at the extended ends thereof and adapted for use in continuity check; in combination with, a battery recharging unit mounted in the center compartment of said bottom housing connected to and for recharging said dry cell battery disposed in the adjacent longitudinal compartment of said bottom housing, a pair of contact prongs in said bottom housing having the upper ends extending into said upper housing for securing same in mounted position, one of said prongs for connecting said recharging unit at the lower end thereof and the other prong for contacting said dry cell battery disposed adjacently thereto in its respective longitudinal compartment, the upwardly extending ends of said pair of contact prongs being used for contacting the outlet of A.C. voltage current source when said upper housing is removed from its mounted position upon said bottom housing and thereby recharging said dry cell battery disposed in said longitudinal compartment of said bottom housing.

2. In the apparatus of the class described as defined in claim 1, wherein, each open end of said longitudinal compartment in said bottom housing is provided with a threaded end wall for closing said open ends and for securing therein the respective closing plugs, a contact plate means embedded within said threaded end wall of at least one of said longitudinal compartments for interconnecting at least one of said respective closing plugs and for making a contact with the cathode electrode of said dry cell battery disposed therein, and a contact wire connecting said contact plate means disposed in said threaded end wall and also for connecting the respective contact prong disposed in said bottom housing and thereby providing the electrical circuit connection for said light bulb of said flashlight unit.

References Cited by the Examiner

UNITED STATES PATENTS

| 2,703,385 | 3/55 | Curd | 324—53 |
| 2,846,644 | 8/58 | Costello | 324—53 |
| 2,899,638 | 8/59 | Olson | 324—53 |
| 3,005,090 | 10/61 | Moore | 200—60 X |
| 3,061,776 | 10/62 | Rosenstrach | 324—53 |

FOREIGN PATENTS

| 928,209 | 11/47 | France. |
| 587,036 | 4/47 | Great Britain. |

WALTER L. CARLSON, *Primary Examiner.*